United States Patent [19]

Pecsok et al.

[11] 4,413,298
[45] Nov. 1, 1983

[54] DISKETTE JACKET

[75] Inventors: Roger L. Pecsok, Cottage Grove; Ray G. McCrea, Jr., Stillwater; Craig F. Lamphere, St. Paul, all of Minn.

[73] Assignee: Minnesota Mining and Manufacturing Company, Saint Paul, Minn.

[21] Appl. No.: 260,709

[22] Filed: May 5, 1981

[51] Int. Cl.³ .............................................. G11B 23/02
[52] U.S. Cl. .................................... 360/133; 206/313
[58] Field of Search ....................... 206/303, 313, 444; 360/133, 137; 428/900, 39, 480

[56] References Cited

U.S. PATENT DOCUMENTS

| 4,038,693 | 7/1977 | Huffine et al. | 360/133 X |
| 4,251,843 | 2/1981 | Masuyama et al. | 360/137 |
| 4,263,634 | 4/1981 | Chenoweth | 360/133 |
| 4,272,475 | 6/1981 | Chi | 264/211 X |
| 4,307,137 | 12/1981 | Ota et al. | 264/250 X |

Primary Examiner—John H. Wolff
Attorney, Agent, or Firm—Donald M. Sell; James A. Smith; Douglas B. Little

[57] ABSTRACT

A diskette jacket is made from biaxially-oriented polyester film containing particles of a different polymer which provide a matte finish that aesthetically masks scratches and smudges. The polyester film provides better resistance to pillowing and to scratching as compared to the polyvinylchloride diskette jackets of the prior art.

8 Claims, 2 Drawing Figures

DISKETTE JACKET

TECHNICAL FIELD

This invention concerns a novel jacket for a magnetic recording diskette of the type disclosed in U.S. Pat. Nos. 3,668,658 (Flores et al.) and 4,038,693 (Huffine et al.).

BACKGROUND ART

The jackets of virtually all diskettes are polyvinylchloride film containing carbon black for opacity. The film is embossed to create a matte finish for aesthetic purposes, mainly so that scratches and smudges are less noticeable. Furthermore, the matte finish reduces friction between adjacent sheets of film when stacked. Thus the bottom sheet is more readily fed from the stack into equipment for forming a jacket from the sheets.

If a diskette is exposed to heat, the distortion of the vinyl film may cause the jacket to warp into a "pillow" shape which may prevent inserting it into a diskette drive and cause other operational problems. ANSI Specification No. X3B8/78-145 includes a "pillow" test wherein a diskette is heated in an oven for a period of time, allowed to cool to room temperature, and then dropped under its own weight through a slot of a certain thickness. After heating for 72 hours at 52° C., an appreciable proportion of diskettes now on the market will fail to drop through the slot. To pass this test, a few diskette jackets are made of modified vinyl or other films which have better thermal stability, but at significantly increased cost of raw material.

Although it has long been known that biaxially-oriented polyester film such as biaxially-oriented polyethylene terephthalate film would provide better thermal stability, we are not aware of any diskettes on the market that have polyester jackets.

DISCLOSURE OF INVENTION

As compared to polyvinylchloride jackets, the diskette jacket of the present invention provides far better thermal stability, can be made at substantially the same cost, and is equal or better in other respects, such as being more resistant to scratching and about as good at hiding scratches and smudges. The jacket of the present invention comprises biaxially-oriented polyester polymer film which has a matte finish as a consequence of containing discrete, uniformly-distributed polymeric particles having an average diameter of 5 to 100 micrometers and comprising 5 to 30% by volume of the polyester film, an adhesive layer covering the inner face of the film, and a wiping fabric bonded by the adhesive layer to the inner face of the film.

The intrinsic viscosity (IV) of the polyester polymer may be in the range of 0.4 to 1.0. Above about 0.8 IV, the polyester polymer might be difficult to extrude at practical rates. Below about 0.45 IV, the polyester film might be too brittle. A preferred polyester polymer is polyethylene terephthalate because it provides excellent thermal stability, high strength and toughness and is readily available at reasonable cost within a preferred range of 0.55 to 0.65 IV. The melt flow rate ASTM D1238L of the particle-producing polymer should be less than 2 decigrams/minute, preferably less than 1 dg/min., because this insures that there will be discrete polymeric particles averaging at least 5 micrometers in diameter, even after the melted polymers have been vigorously mixed together. If the melt flow rate of the particle-producing polymer exceeds 1 dg/min., it may be desirable to mix the melted polymers less vigorously, especially if the IV of the polyester polymer is toward the high end of the 0.4 to 1.0 range. However, when the polymer mixture contains a pigment, vigorous mixing is usually desirable to insure adequate and uniform opacity of the polyester film.

While more vigorous mixing tends to reduce the particle size, the average particle size is likely to remain above 25 micrometers if the IV of the polyester is 0.55 to 0.65 and the melt flow rate of the particle-producing polymer is within the preferred range of 0.4 to 0.8 dg/min. An average particle size of more than 5 micrometers should produce a matte finish that will effectively hide scratches and smudges if the particles comprise at least 10% by volume of the polyester film. An average particle size of more than 25 micrometers should produce an effective matte finish if the particles comprise at least 5% by volume of the polyester film.

Because higher pigment levels tend to increase reflectivity, the particle-producing polymer preferably comprises at least 20% by volume of the jacket material when the pigment exceeds 1% by volume. Best hiding of scratches and smudges is attained when the particle-producing polymer comprises at least 10-20% by volume of the jacket material, the average particle size is between 25 and 75 micrometers, and the amount of pigment is at the lowest level that will afford the opacity required by the aforementioned ANSI Specification No. X3B8/78-145. The use of the particle-producing polymer at more than 30% by volume should be avoided, because this tends to decrease the strength and rigidity of the jacket material.

The jacket material may be obtained by co-extruding a particle-containing polyester as described above with another film-forming material and then biaxially-orienting the co-extruded duel-layer film. The matte finish provided by the particle-containing polyester film layer should be at the exterior of the jacket material for aesthetic purposes. The desired opacity of the jacket material may be realized by pigmenting either the particle-containing polyester or the other film-forming material or both.

Instead of pigmenting the jacket material film, the required opacity may be achieved by pigmenting the adhesive layer which covers its inner face. It is desirable that the pigment of the adhesive coating be an electrically-conductive carbon black to enhance the bleeding off of any electrical charges on the recording disk. The elimination of static charges is also enhanced by treating the fibers of the wiping fabric with an anti-static agent, as is known in the art.

The wiping fabric of the novel diskette jacket may be a tissue as in diskettes now on the market or may be a flocked-fiber layer as disclosed and claimed in United States patent application Ser. No. 106,753 now abandoned, filed Dec. 26, 1979 (Miklos et al.) now abandoned and continuation-in-part Application Ser. No. 302,293 filed Sept. 14, 1981, both of which are commonly assigned with this application.

Preferred as the particle-producing polymer are polypropylene and polyethylene which are readily available at reasonably low cost with melt flow rates in the desired range. Polysulfones and poly(2-methyl-1-pentene)

have also been used with good results but are expensive. Polycarbonates should be useful but also are expensive.

Typical jacket materials of the invention at thicknesses of 160–200 micrometers are about equal in strength to and have somewhat better stiffness than polyvinylchloride films of 250–300 micrometers that are currently in widespread use. Hence, the diskette jacket can be thinner, thus providing a reduction in cost which can offset the higher cost per unit weight of polyester versus polyvinylchloride.

Figure 1:
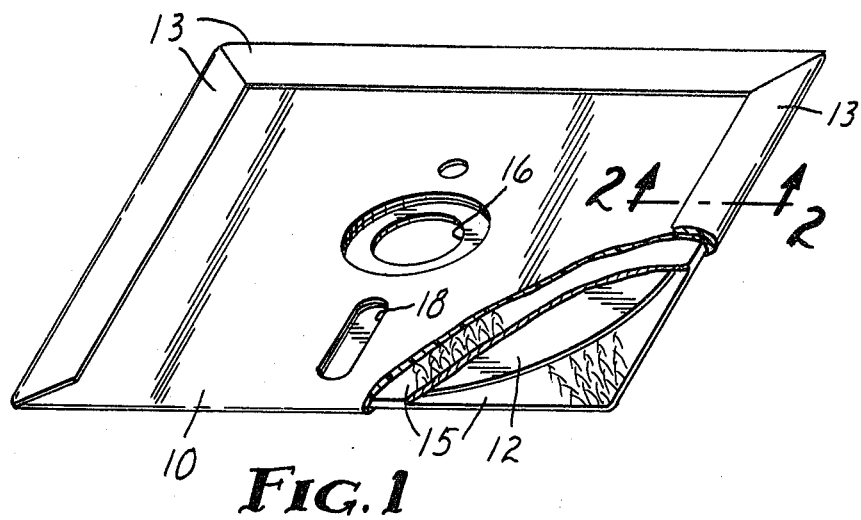
FIG. 1 of the drawing is a perspective view of a diskette, cut away to show details.

As seen in the drawing, a piece of polyester film 10 is folded around a magnetic recording disk 12 to provide a jacket which is sealed along three overlapping flaps 13 by an adhesive layer 14 which covers the entire inner face of the polyester film. The adhesive also serves to bond a wiping fabric 15 to the inner face of the polyester film. In use, the disk 12 is rotatively driven at its central opening 16 while the jacket remains stationary, and a magnetic recording head (not shown) contacts the rotating disk through either of the identical apertures 18 in each of the side walls of the jacket.

In the following examples, all parts are given by weight except as noted.

EXAMPLE 1

35 parts of polypropylene pellets (melt flow rate of 0.8 dg/min., Hercules "Profax" 6723) were mixed with 6 parts of carbon black masterbatch pellets consisting of 25% carbon black pigment in a copolyester (Ciba Geigy D8200 masterbatch). Using a dry-solids-feed auger, this mixture was continuously added at the hopper of an extruder containing polyethylene terephthalate having an IV of 0.6. The extrudate was quenched onto a cooled casting roll to provide a pigmented polyester film containing polypropylene particles comprising by volume polyethylene terephthalate—84.9%
polypropylene particles—14.8%
carbon black pigment—0.3%.
average polypropylene particle size—40 μm The extruded film was continuously first oriented over hot rolls 2.5X in the machine direction at about 100° C., then 3.5X traversely in a tenter at about 100° C., and then heat-set at about 200° C. The resultant biaxially-oriented polyester film had a thickness of about 200 micrometers and a matte finish as indicated by a gloss value (measured at 45° using a Gardner glossmeter) of 64. Other properties of the polyester film were:

|  | Machine Direction | Transverse Direction |
| --- | --- | --- |
| Ultimate Tensile Strength (ASTM D882-6HT, method A) | 710 kg/cm² | 775 kg/cm² |
| Ultimate elongation | 100% | 70% |
| Shrinkage after 15 min. at 150° C. | 1.0% | 0.8% |

To test the effectiveness of hiding smudges, mineral oil was blotted onto the film and the gloss value was measured at 68. Since this differs from the original gloss value by only 6%, oily smudges such as fingerprints should not be an aesthetic problem.

A roll of the polyester film was knife-coated on one face with a water-borne acrylic-vinyl adhesive to a wet thickness of about 5 mils (0.125 mm) which by itself would dry to a thickness of about 3 mils (0.075 mm). To provide a wiping fabric, random-cut cotton flock (2–6 denier and 0.05–0.4 mm in length) was electrostatically attracted to the adhesive coating which was tacky and viscous, and the fibers were embedded into the adhesive with the aid of beater bars. After the flocked-fiber layer coat was dried in an air-circulating oven for 2 minutes at 50° C., both surfaces were aggressively brushed and vacuumed to remove loose fibers. An antistatic solution (quaternary amine type) was sprayed onto the flocked-fiber layer, and the finished material was wound up into a stock roll. The overall thickness of the jacket material with its flocked-fiber layer was 18 mils (0.45 mm).

The stock roll was later slit to a useful width, further cleaned. Sheets cut from the roll were stacked and placed in an oven at about 93° C. for two hours to remove the roll-induced curl.

The sheets were die-cut to provide blanks which were folded while being heated to about 200° C. with an infrared lamp. The edges of the folds were rubbed under continued heating to minimize plastic memory. The side flaps were sealed with a hot-melt adhesive. A magnetic recording disk was inserted, and the third flap was sealed with the adhesive to provide a finished diskette which had a good appearance and was adjudged to be more resistant to scratching than are polyvinylchloride diskette jackets of the prior art. The matte finish of the diskette jacket was fairly effective in hiding scratches and smudges.

A number of the diskettes of this example were tested for toughness by being repeatedly dropped edgewise about 20 cm so that the corners of its head-slot edge impacted flat metal stops having a length of about one cm. None had any observable cracks after being dropped 500 times.

A diskette was held horizontally, flaps down, in a clamp at a corner opposite from the head slot. The clamp extended 2.5 cm diagonally from the corner. The opposite corner of the diskette dropped to 6.5 cm below the horizontal. In this test, typical vinyl diskettes of the prior art have a droop within the range of 5 to 11.5 cm.

Experiments with other sample diskettes of the invention indicate that the droop can be substantially decreased by slightly increasing the thickness of the polyester film or, without changing that thickness, by changing the adhesive which seals the flaps and/or the method of applying the adhesive.

EXAMPLE 2

Ten parts of the polypropylene pellets and 3 parts of the carbon black masterbatch pellets were continuously added to polyethylene terephthalate as in Example 1, and this was coextruded with a film-forming material consisting of 97 parts of the polyethylene terephthalate and 3 parts of the carbon black masterbatch used in Example 1. Biaxial orientation of 3X by 3X provided a dual-layer film about 200 micrometers in thickness, of which the polypropylene-particle-containing polyester film layer provided about 10 micrometers. The matte finish of one side of the dual layer film was comparable in appearance to that of Example 1. The pigmented particle-containing layer comprised by volume Polyethylene terephthalate—86.9%

Polypropylene—12.6%
Carbon black—0.5%
Average polypropylene particle size—35 μm

Onto the shiny surface of a roll of the dual-layer film was coated a layer of a heat-activatable adhesive comprising a thermoplastic polyester resin (Goodyear VPE-5824) and highly-conductive carbon black particles. After die-cutting to provide a diskette jacket blank, a wiping fabirc was applied consisting of a non-woven polyester tissue (Kendall "Novonette" No. 9305). Using a heated (200° C.) metal roll having points every 0.5 cm in both directions, the adhesive melted at the points to bond the tissue to the jacket material.

Figure 2:
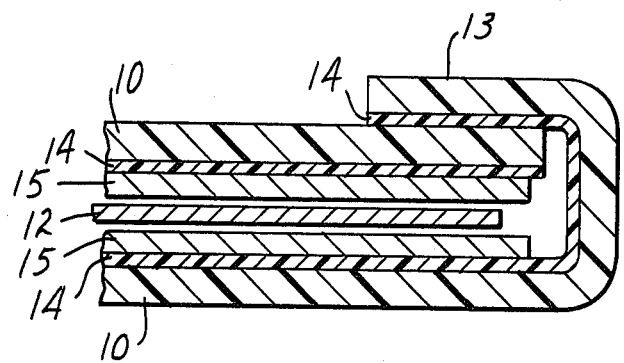
FIG. 2 is an enlarged section taken along 2—2 of FIG. 1.

The uncovered flaps of the jacket material were folded and rubbed with heating as in Example 1 to provide a diskette as illustrated in FIGS. 1 and 2 of the drawing. The heat applied in doing so was insufficient to activate the adhesive. Although the folded edges remained unsealed, the diskette was functional and of good aesthetic appearance.

We claim:

1. An opaque diskette jacket comprising
    biaxially-oriented polyester film containing discrete, uniformly-distributed polymeric particles having an average diameter of 5 to 100 micrometers and comprising 5 to 30% by volume of the polyester film to provide a matte finish,
    an adhesive layer covering the inner face of the film, and
    a wiping fabric bonded by the adhesive layer to the inner face of the film.

2. A diskette jacket as defined in claim 1, wherein the thickness of said polyester film is 160 to 200 micrometers.

3. A diskette jacket as defined in claims 1 or 2, wherein said polyester film is a dual-layer film, the outer layer of which is a particle-containing polyester.

4. A diskette jacket as defined in claim 1, wherein said adhesive layer is filled with conductive carbon black.

5. A diskette jacket as defined in claim 1, wherein said polyester is polyethylene terephthalate.

6. A diskette jacket as defined in claim 1, wherein said polymeric particles comprise polyolefin having a melt flow rate of less than 2 dg/min.

7. A diskette jacket as defined in claim 6, wherein said polyolefin is polypropylene having a melt flow rate of 0.4 to 0.8 dg/min.

8. A diskette comprising a diskette jacket as defined in claim 1 enclosing a magnetic recording disk.

* * * * *